United States Patent
Caruso et al.

(10) Patent No.: US 7,127,485 B2
(45) Date of Patent: Oct. 24, 2006

(54) ADAPTIVE POLLING FOR ASYNCHRONOUS NOTIFICATION

(75) Inventors: Francesco Caruso, Madison, NJ (US); Josephine Micallef, Maplewood, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 620 days.

(21) Appl. No.: 10/052,099

(22) Filed: Jan. 18, 2002

(65) Prior Publication Data

US 2003/0140092 A1    Jul. 24, 2003

(51) Int. Cl.
*G06F 15/16* (2006.01)
(52) U.S. Cl. .................. 709/203; 709/217; 709/219
(58) Field of Classification Search ................ 708/202, 708/203, 219, 229; 709/202, 203, 219, 217, 709/223, 225
See application file for complete search history.

(56) References Cited

U.S. PATENT DOCUMENTS

| | | | | |
|---|---|---|---|---|
| 5,983,268 A | * | 11/1999 | Freivald et al. | 709/218 |
| 6,275,858 B1 | * | 8/2001 | Bates et al. | 709/228 |
| 6,418,469 B1 | * | 7/2002 | Justice et al. | 709/224 |
| 6,745,224 B1 | * | 6/2004 | D'Souza et al. | 709/202 |
| 6,838,986 B1 | * | 1/2005 | Shteyn | 340/531 |

\* cited by examiner

*Primary Examiner*—Ario Etienne
*Assistant Examiner*—Sargon N. Nano
(74) *Attorney, Agent, or Firm*—Joseph Giordann; James W. Falk; Philip J. Feig

(57) ABSTRACT

A system for adaptive notification in a data communications network. The system includes a data transport network in communication with a client and a server. The client comprises a client-side adaptive notification processor in communication with the data transport network. The server comprises a server-side adaptive notification processor in communication with the data transport network.

1 Claim, 4 Drawing Sheets

ADAPTIVE POLLING FOR ASYNCHRONOUS NOTIFICATION

FIELD OF THE INVENTION

This invention relates to asynchronous notification applications in a data communications network.

BACKGROUND OF THE INVENTION

The use of client-server applications has risen dramatically in the past decades. One of the processes that is important for a wide class of client-server applications is asynchronous notification. Asynchronous notifications may be defined as communication from a server to a distributed client application. The client may be comprised of one or more of a plurality of client entities. A typical application of asynchronous notifications is the delivery of alarms to administrators in a network surveillance system. Mechanisms for handling asynchronous notifications in distributed systems can be classified as "push" or "pull" techniques.

A push mechanism sends new information to the client as soon as it is available on the server. Such a mechanism may be inadequate for supporting large numbers of clients in a Web based application because of the need to maintain persistent connections with each client. Push systems generally require the full client state to be maintained on the server side of the system, so that the server application has the information that it needs to push information to the clients.

A pull, or polling, mechanism involves the client periodically contacting the server to determine if any new information is available. The client polling setup is completely controlled by the client, and the polling rate must generally be established a priori to accommodate the worst possible scenario. The communications network bandwidth used by this pull mechanism is proportional to the number of clients. But because of the a priori establishment of poll rates, during periods of light workloads with a small number of clients, network resources are underutilized. Similarly, during periods of heavy workloads beyond the expected worst case scenario, network resources are overloaded by the client polling mechanism; this congestion leads to significant degradation of the service and potentially complete failure. Therefore, an inherent scalability constraint exists due to the limited traffic capacity of the network.

The present invention is directed to overcoming one or more of the problems identified above.

SUMMARY OF THE INVENTION

An exemplary embodiment of the present invention provides a system for adaptive notification in a data communications network. The system includes a data transport network in communication with a client and a server. The client comprises a client-side adaptive notification processor in communication with the data transport network. The server comprises a server-side adaptive notification processor in communication with the data transport network.

Another exemplary embodiment of the invention provides a method for implementing adaptive notification in a client in a client-server system. The client sends registration information to a server and polls the server at a time interval based on a stored refresh interval. The client also receives an adaptive notification from the server, where the adaptive notification includes an updated refresh interval. Also, the client stores the update refresh interval in the client as the stored refresh interval.

Another exemplary embodiment of the invention provides a method of implementing adaptive notification in a server in a client-server system. The server receives registration information from a client. Next, the server receives a request for an adaptive notification from the client and calculates a refresh interval based on the registration information from the client. Then, the server sends the adaptive notification to the client, where the adaptive notification includes the refresh interval.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts and signals.

Figure 1:
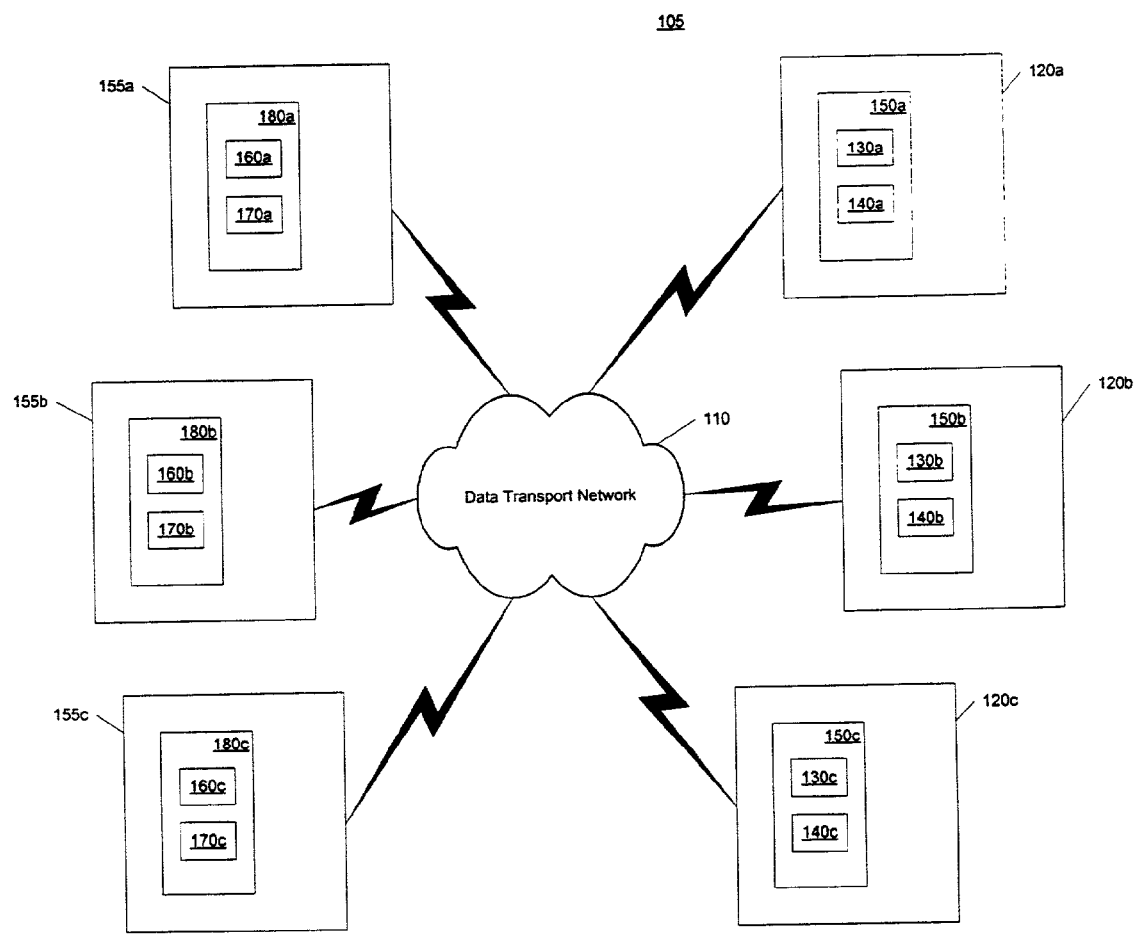
FIG. 1 illustrates a system consistent with an exemplary embodiment of the present invention.

FIG. 1 illustrates a system 105 consistent with an exemplary embodiment of the present invention. The system 105 comprises at least one or more servers 120a–c in communication with a data transport network 110. Data transport network 110 may be a public communications network such as the Internet, a private communications network comprising wide area networks (WANs), local area networks (LANs), or a combination of the above. The servers 120a–c communicate through the data transport network 110 to one or more clients 155a–c. For any given client-server application, each server 120a–c may be associated with one or more clients 155a–c. Each client may be running one or more client-server applications, and, in the exemplary embodiment of the present invention, each client-server application may be associated with a particular server 120a–c.

Depending on the client-server application, clients 155a–c may need to receive notification of events from their associated servers. In an exemplary embodiment of the invention, each server 120a–c includes a server-side adaptive notification processor 150a–c. An adaptive notification is an asynchronous notification that may have refresh rate information included or appended to the asynchronous notification. In such an exemplary embodiment of the invention, the server-side adaptive notification processor 150a–c may be responsible for registering clients, computing refresh rates for adaptive notifications to clients, and responding to client polling with adaptive notifications. Those skilled in the art will appreciate that these processes may be performed by multiple processors, for instance, or certain of these processes may be delegated to other network entities for processing or calculation.

Each server-side adaptive notification processor may include a global state manager 140*a*–*c* and a dispatcher 130*a*–*c*. The global state manager 140*a*–*c* maintains registration information about each client 155*a*–*c* or class of client 155*a*–*c* that may receive adaptive notifications from the server 120*a*–*c*. Registration may be initiated by the client 155*a*–*c* when the client 155*a*–*c* contacts the server 120*a*–*c*, or registration may be initiated by the global state manager 140*a*–*c* when the client 155*a*–*c* joins the network 110. The registration information may include, for example: the speed of the data link from the client 155*a*–*c* to the server 120*a*–*c*; the class of the client, administrator, non-administrator, high priority, low priority; and the communications processing power of the client. Those skilled in the art will appreciate that the type of registration information will vary with the requirements of the algorithm used to compute the adaptive refresh rates.

In an exemplary embodiment of the invention, the global state manager 140*a*–*c* may compute refresh intervals for each registered client 155*a*–*c* or for each class of registered client 155*a*–*c*. The refresh interval may be computed based on one or more pieces of data from the registration information for each client 155*a*–*c*, as well as on network traffic data, such as the number of active clients. In a first exemplary embodiment, the refresh interval is computed for each client based on the number of active clients and is established to be an interval that is inversely proportional to the number of active clients. In a second exemplary embodiment, the refresh interval may be computed for each client based on the number of active clients and the characteristics of the client, e.g., class of service, processing power, and/or connection speed. In a third exemplary embodiment, the refresh interval may be computed for each class of client based on the number of active clients and the class of the client.

The dispatcher 130*a*–*c* responds to the clients 155*a*–*c* polling of the server 120*a*–*c* for adaptive notifications.

Each client 155*a*–*c* includes a client-side adaptive notification processor 180*a*–*c*, respectively. The client-side adaptive notification processor 180*a*–*c* may register with its associated server 120*a*–*c* and receive adaptive notifications from its associated server 120*a*–*c*. The client-side adaptive notification processor 180*a*–*c* may include a client registration processor 160*a*–*c* and a client receiver 170*a*–*c*. The client registration processor 160*a*–*c* may register the client 155*a*–*c* with its associated server 120*a*–*c* or respond to registration requests from the associated server 120*a*–*c*. Registration may include sending one or more pieces of data of registration information for the client 155*a*–*c* to the associated server 120*a*–*c* at the time the client 155*a*–*c* joins the network 110. The client registration processor 160*a*–*c* may also periodically resend registration information to the associated server 120*a*–*c* as registration information within the client 155*a*–*c* changes. The client receiver 170*a*–*c* receives adaptive notifications and refresh interval information from the associated server 120*a*–*c*.

Figure 2:
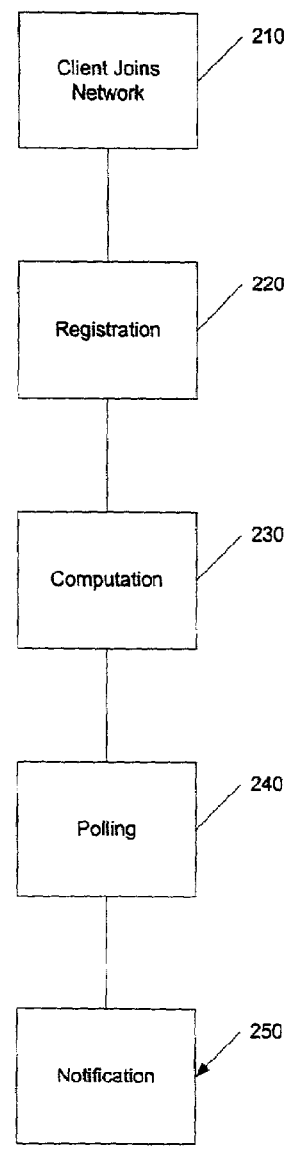
FIG. 2 illustrates a flowchart of a method of receiving adaptive notification consistent with an exemplary embodiment of the present invention.

FIG. 2 illustrates a flowchart of a method of receiving adaptive notification consistent with an exemplary embodiment of the present invention. At stage 210, a client joins the network. At stage 220, the registration process occurs. At registration, the client notifies its associated server of its presence on the network and transmits registration information to the server. In an alternative embodiment, the server initiates the request of registration information from the client after the client joins the network at stage 210.

At stage 230, the server computes the refresh interval based at least in part upon the number of clients active on the network. The server may also use registration information to compute the refresh interval. The server sends the refresh interval to the client.

At stage 240, the client polls the server for a notification based upon the refresh interval that has been sent to the client from the server.

At stage 250, the server computes a new refresh interval and returns the adaptive notification to the client. The adaptive notification includes the notification information and the new refresh interval.

Figure 3:
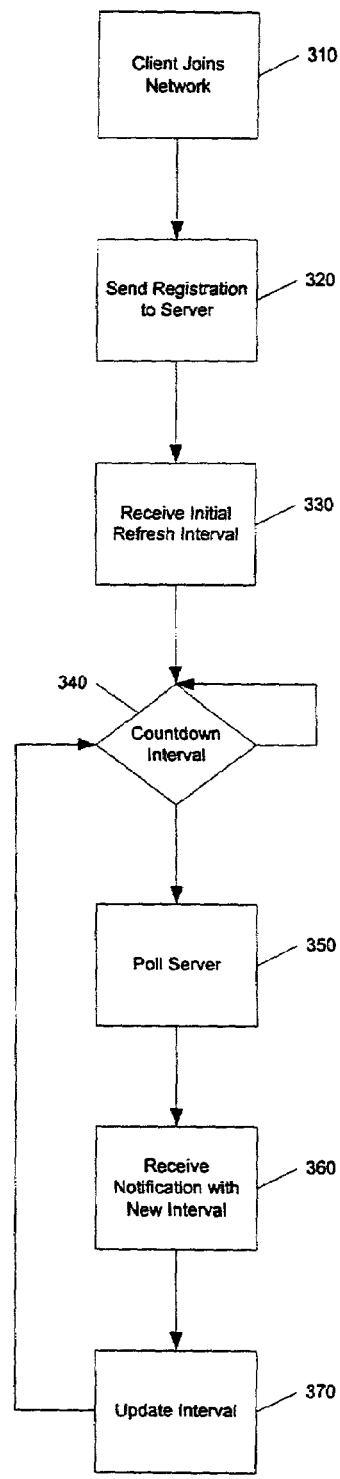
FIG. 3 illustrates a flow chart of the steps performed by the client-side adaptive notification processor consistent with an exemplary embodiment of the present invention.

FIG. 3 illustrates a flow chart of the steps performed by the client-side adaptive notification processor consistent with an exemplary embodiment of the present invention. At stage 310, the client joins the network. At stage 320, in an exemplary embodiment of the invention, the client registration processor sends registration information to the server. In an alternative embodiment of the invention, the client registration processor may respond to a request for registration information from the server.

At stage 330, the client receiver will receive a refresh interval from the server. The refresh interval is the value used at stage 340 to wait until the client will poll the server for an adaptive notification. After waiting for the length of the refresh interval, the client, at stage 340, polls the server for an adaptive notification.

At stage 360, the client receiver receives the adaptive notification from the server. The adaptive notification may include the notification information, as well as an updated refresh interval. In alternative embodiments of the present invention, adaptive notifications may not always contain refresh intervals, with the refresh intervals only being sent by the server when the value of the refresh interval changes from the last computed value sent. Assuming a refresh interval has been received, at stage 370, the client updates the refresh interval to the newly received value. The client then returns to stage 340 and waits the length of the new refresh interval before polling the server once again.

Figure 4:
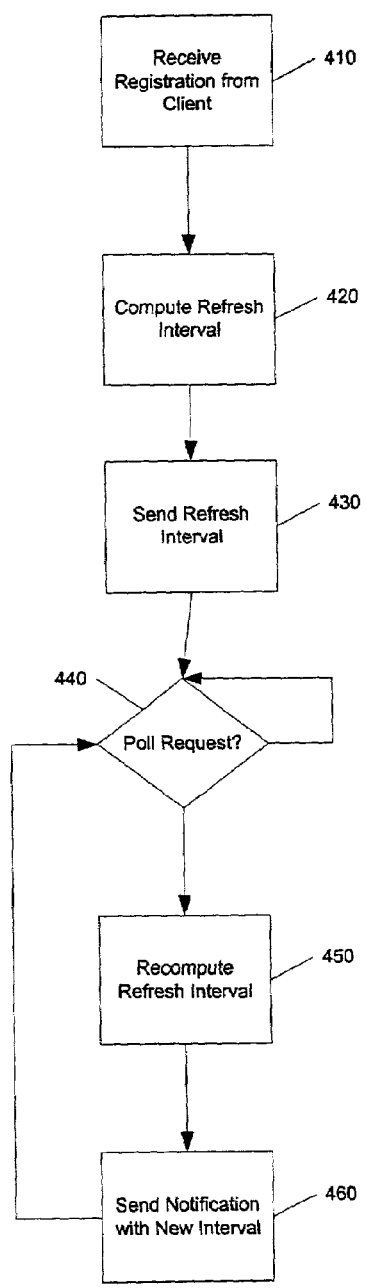
FIG. 4 illustrates a flow chart of the steps performed by the server-side adaptive notification processor consistent with an exemplary embodiment of the present invention.

FIG. 4 illustrates a flow chart of the steps performed by the server-side adaptive notification processor consistent with an exemplary embodiment of the present invention. At stage 410, registration information is received from the client. Registration may be independently sent from the client to the server or may be sent as a response to a request generated by the server. At stage 420, the server computes the refresh interval based at least in part upon the number of active clients currently associated with the server. Generally, the refresh interval will be calculated as inversely proportional to the number of clients utilizing the server. By calculating the refresh interval as inversely proportional to the number of active clients, the system 105 is inherently scalable. As traffic on the network increases, the refresh interval will be decreased, but, as clients drop off of the network making more bandwidth available, the refresh interval will be increased.

The refresh interval may also be varied by the class of clients. For instance, in an alarm application, administrator class clients may have a shorter refresh interval calculated than non-administrator clients because the administrator clients may have less tolerance for delays. In addition, the system 105 may vary the refresh interval based on the processing power of the clients or the connection speed of the clients.

At stage 430, the refresh interval is sent to the clients. At stage 440, the server monitors and waits for a poll request from a client. When a poll request is received, the server may recompute the refresh interval at stage 450 utilizing a refresh algorithm as described for stage 420.

At stage 460, the adaptive notification is sent back to the client that polled the server. The adaptive notification, in an exemplary embodiment, has the new refresh rate included in the notification. In an alternative embodiment, the adaptive notification may only include a refresh rate if the newly recalculated refresh rate differs from the previously sent refresh rate to that client.

The preceding text describes an asynchronous notification application in a data communications network.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method for implementing adaptive notification to a client in a client-server system, wherein asynchronous notifications are sent from a server to a client in a data communication system and based on a refresh interval for that client, the method comprising the steps of:

the client sending registration information to the server;

the server setting a refresh polling interval for the client, the refresh polling interval being the time interval between notifications of new information being sent from the server to the client, the refresh polling interval being calculated based on at least one of the following pieces of data for the client: processing power of the client, the connection speed of the clients, and the class of service of the client;

the server sending the refresh polling interval to the client and the client storing the sent refresh polling interval;

the client polling the server for an asynchronous notification of new information at the time intervals based on the refresh polling interval stored at the client; and the server transmitting a notification including such new information over the data communication system to the client in response to said polling.

* * * * *